No. 872,512. PATENTED DEC. 3, 1907.
J. W. HAYS.
POWER TRANSMISSION DEVICE.
APPLICATION FILED MAR. 25, 1907.
2 SHEETS—SHEET 1.
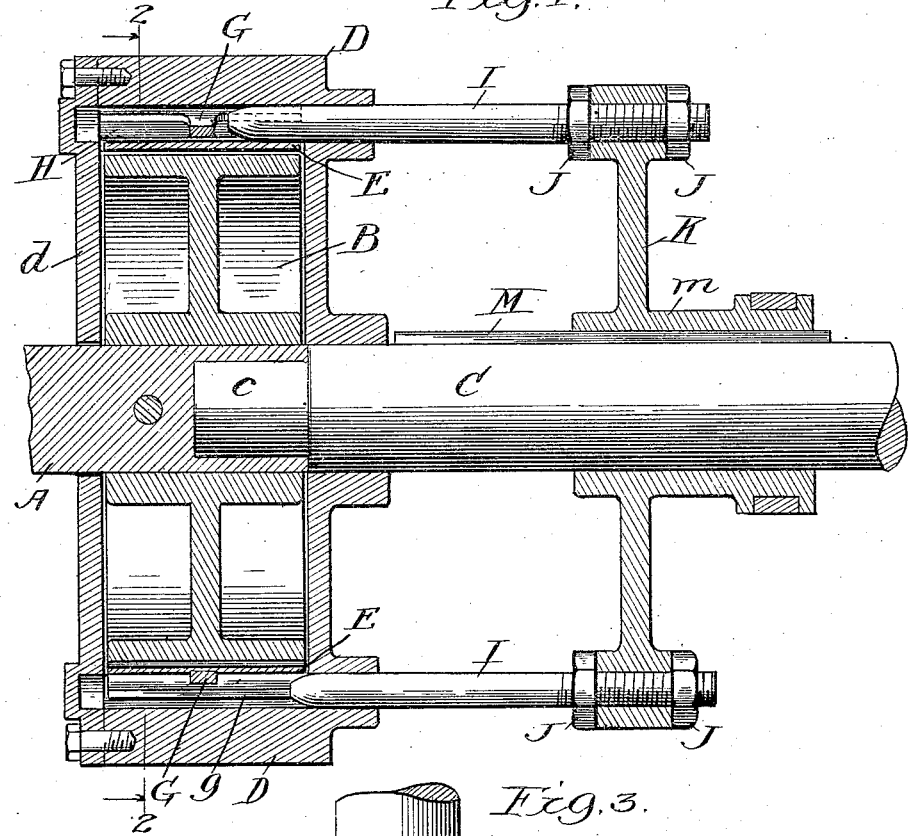
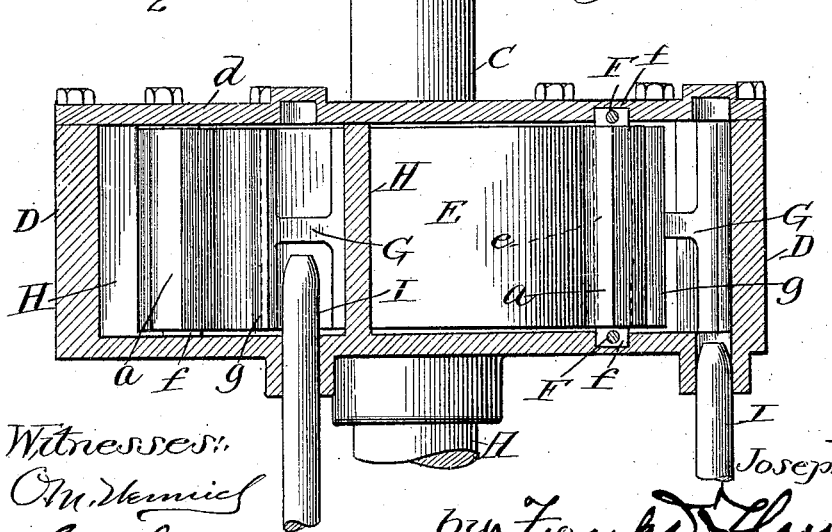
Witnesses:
Inventor
Joseph W. Hays.
by Frank D. Thomason
Atty No. 872,512. PATENTED DEC. 3, 1907.
J. W. HAYS.
POWER TRANSMISSION DEVICE.
APPLICATION FILED MAR. 25, 1907.
2 SHEETS—SHEET 2.
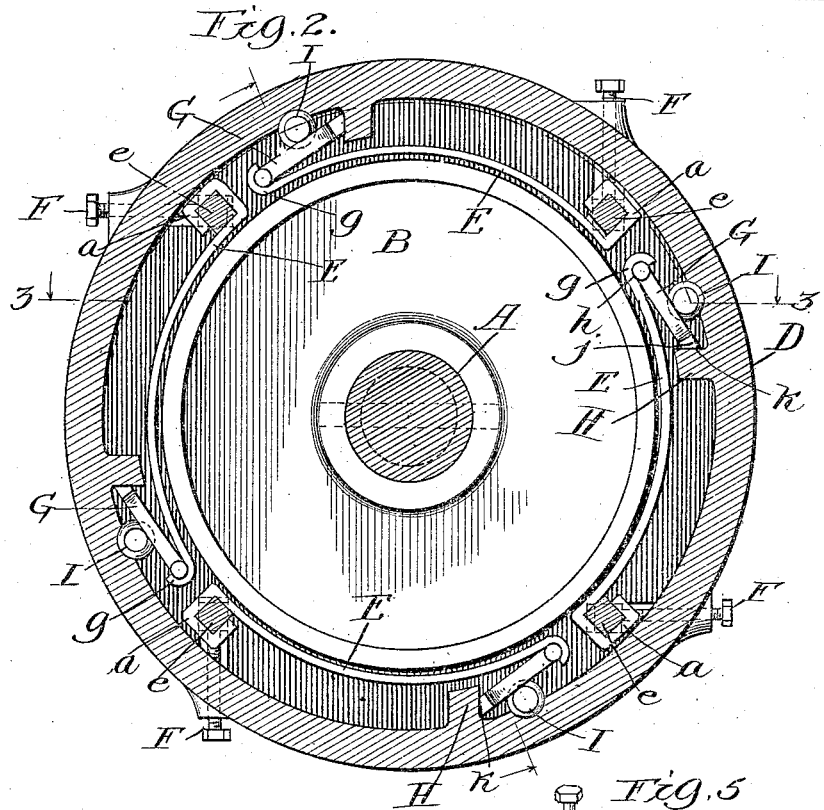
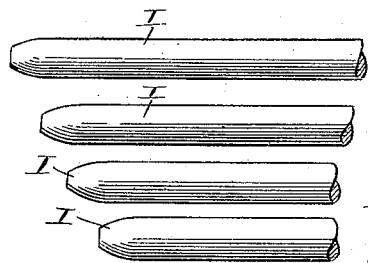
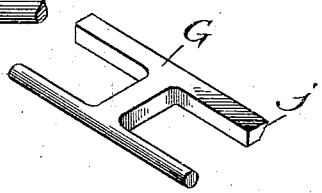
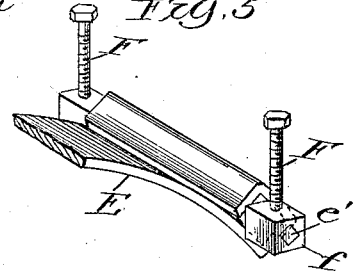
Witnesses
O. W. Nennic
E. A. Lundy
Inventor
Joseph W. Hays
by Frank D. Thomason
Atty

UNITED STATES PATENT OFFICE.

JOSEPH W. HAYS, OF CHICAGO, ILLINOIS.

POWER-TRANSMISSION DEVICE.

No. 872,512.                Specification of Letters Patent.            Patented Dec. 3, 1907.

Application filed March 25, 1907. Serial No. 364,422.

*To all whom it may concern:*

Be it known that I, JOSEPH W. HAYS, a citizen of the United States, and a resident of Chicago, in the county of Cook and State of Illinois, have invented certain new and useful Improvements in Power - Transmission Devices, of which the following is a clear, full, and exact description.

My invention relates more particularly to clutches for the transmission gears of automobiles, although it may be used in any connection in which it is desired to transmit motion from a driving shaft to an alining driven shaft.

The object of my improvement is to provide a frictional contact between the driving and driven members of the clutch, by means of a series of segmental clutch shoes, which are adapted to engage the circumference of one of said members, one after the other, to make the connection between said members gradual and not sudden, but so that the contact between said members at the commencement of the engagement thereof and the ending of the separation movement of the same will be of a slipping nature. And a further object of my invention is to make the clutch-shoes, and the sets of mechanical devices used in connection therewith, each the replica of the other. This I accomplish by the means hereinafter fully described and as particularly pointed out in the claims.

In the drawings:—Figure 1 is a longitudinal section of my improved clutch showing the parts of the same applied to the engaging ends of alining driving and driven shafts. Fig. 2 is a transverse section thereof taken on dotted line 2—2, Fig. 1. Fig. 3 is a plan view of the same with the circular wall of the inclosing case removed. Figs. 4, 5 and 6 are, respectively, views showing details of the devices for adjusting and actuating the shoes.

Referring to the drawings A represents the end of a shaft having a drum B of suitable diameter secured thereto, and C is the end of an alining shaft whose extremity *c* is reduced and adapted to enter a corresponding socket made therefor in the end of the shaft A. Shaft C has mounted thereon a case D whose circumferential walls are greater in diameter than the outer circumference of the drum B, so as to leave a space between the inner circumference of the one and the outer circumference of the other, and the open side of the case D is closed by a circular plate *d*, by means of screws that are tapped into the annular edges of the circumferential walls of the case. Thus constructed the case incloses drum B, the width of which adapts it to fit snugly between plate *d* and the opposite head of the case, and yet revolve freely between the same.

In order to communicate the motion of case D to drum B, or vice versa, I employ a series of segmental clutch-shoes E that, preferably, correspond in length and have one end bent outwards and then back over itself to form a knuckle *a*, which embraces a cross-bar *e*, which is rectangular in cross-section. This cross-bar *e* corresponds in length to the width of the shoe and is not movable on its axis and it has longitudinal extensions *e'* at each end, that are also rectangular in cross-section, but less in transverse dimensions than the bar from which they project. These extensions, *e'*, are adapted to enter guide-blocks *f*, which latter are of rectangular dimensions and are seated in tangentially extending grooves in the inner surface of the head of the case, and in the plate *d*, extending from near the outer circumference of the drum to the inner circumference of the circular walls of the case. Guide-blocks *f* are engaged by gage-screws F tapped in the same tangential plane as the same through the outer circumference of the case, substantially as shown.

The shoes E are, preferably, made of comparatively well tempered band steel, and are bent or curved so that their engaging surfaces correspond to the segment of the circumference of the drum adapted to be engaged thereby. The ends *g* of these shoes, opposite the knuckles *a*, are curled outwards and form a seat for the adjacent alining transverse end-members *h* of an I-shaped presser-foot G. The opposite transverse alining end members *j* of the presser-foot bear against the adjacent side surfaces *k* of a transverse lug H projecting inwards from the inner circumference of the circular walls of the case, and the longitudinal member of this presser-foot connecting end-members *h* and *j* bridges the space between the end *g* of the shoe and said lug H. The end members *h* of said presser-foot are, preferably, cylindrical so as to articulate with the adjacent end of the shoe, and the portion of the end members *j* of the shoe engaging the lug H is beveled, so that when the presser-foot is depressed toward the drum, the contact of the member *j* thereof with the correspondingly inversely beveled side of said lug, will pull the shoe lengthwise slightly as well as move it toward the drum, and cause said shoe to engage the circumference of the drum throughout its length. The adjustability of the end of the shoe opposite the presser-foot, enables one, when assembling the parts of the clutch, to bring all the shoes into the same relative position with the drum, and when this is done the engagement of one of said shoes after the other brings them successively into engagement with said drum, and enables the clutch to gradually increase the area of frictional contact between the driving and driven member so as to avoid the sudden transmission of the full power from the one member to the other, and the consequent shock resulting therefrom, and permits a certain amount of slippage between said members, particularly when the clutch is used for automobiles, and thus saves the chassis considerable strain and concussion, particularly when the automobile is driving over rough ground. There may be as many of these clutch-shoes as desired, but I prefer to use but four of the same and to locate them equal intervals apart. These shoes are brought into engagement with the drum one after the other by means of longitudinally reciprocal plungers I whose axes are parallel with shaft B. Each of these plungers consist of a cylindrical bar having rounded or truncated tapered engaging ends that extend through openings in the head of the case next the inner circumference of the circular walls of the same and are so adjusted longitudinally as to adapt them to engage the presser-feet G, one after the other to depress them and bring the clutch-shoes successively into engagement with the drum. Said plungers are, preferably, of the same length, and their ends farthest from the case are screw-threaded and adjustably secured by nuts J, J, in suitable openings in the arms of a spider-frame K, the boss *m* of which latter has a longitudinally sliding engagement on shaft B, by means of a spline M, but revolves therewith and maintains its relative position with the case of the clutch at all times. This spider-frame is given a longitudinal movement by mechanism (not shown) in the control of the operator, and enables him to accurately gage the extent of the frictional engagement between the members of the clutch absolutely, and obtain just the transmission of power desired from the driving to the driven member.

What I claim as new is:—

1. In a clutch mechanism the combination with a revoluble driving member and a concentric revoluble driven member having alining axes, of a series of segmental shoes arranged in circumferential order one after the other and connected to the outer one of said members, and means for causing said shoes to engage the other member one after the other.

2. In a clutch mechanism the combination with a revoluble driving member and a revoluble driven member, having alining axes, of a series of alining segmental shoes connected to the outer one of said members, and means reciprocal transversely to said shoes for causing the same to engage the other member one after the other.

3. In a clutch mechanism the combination with a revoluble driving member and a concentric revoluble driven member, having alining axes, of a series of corresponding segmental shoes arranged in circumferential order one after the other and connected to the outer one of said members, and means for causing said shoes to engage the other member one after the other.

4. In a clutch mechanism the combination with a revoluble driving member and a concentric revoluble driven member, having alining axes, of a series of corresponding equidistant segmental shoes arranged in circumferential order one after the other and connected to the outer one of said members, and means for causing said shoes to engage the other member one after the other.

5. In a transmission clutch mechanism the combination with a revoluble driving member and a concentric driven member having alining axes, of a series of segmental clutch shoes arranged circumferentially one after the other each having one end connected to the outer one of said members, and means for causing said shoes to engage the other member one after the other.

6. In a transmission clutch mechanism the combination with a revoluble driving member and a concentric driven member having alining axes, of a series of alining segmental clutch shoes each having one end connected to the outer one of said members, and means reciprocal transversely to said shoes for causing the same to engage the other member one after the other.

7. In a transmission clutch mechanism the combination with a revoluble driving member and a concentric driven member having alining axes, of a series of segmental clutch shoes arranged in circumferential order one after the other and each having one end adjustably connected to the outer one of said members, and means for causing said shoes to engage the other member one after the other.

8. In a transmission clutch mechanism the combination with a revoluble driving member and a concentric driven member having alining axes, of a series of segmental clutch shoes arranged in circumferential order one after the other and each having one end connected to the outer one of said members, and means engaging the opposite ends of said shoes whereby the shoes engage the other member one after the other.

9. In a transmission clutch mechanism the combination with a revoluble driving member and a concentric driven member having alining axes, of a series of segmental clutch shoes arranged in circumferential order one after the other and each having one end connected to the outer one of said members, and reciprocal means engaging the opposite ends of said shoes whereby the shoes engage the other member one after the other.

10. In a transmission clutch mechanism the combination with a revoluble driving member and a concentric driven member having alining axes, of a series of segmental clutch shoes arranged in circumferential order one after the other and each having one end adjustably connected to the outer one of said members, and means engaging the opposite ends of said shoes whereby the shoes engage the other member one after the other.

11. In a transmission clutch mechanism the combination with a revoluble driving member and a concentric driven member having alining axes, of a series of segmental clutch shoes arranged in circumferential order one after the other and each having one end adjustably connected to the outer one of said members, and reciprocal means engaging the opposite ends of said shoes whereby the shoes engage the other member one after the other.

12. In a clutch mechanism the combination with a revoluble driving member and a concentric revoluble driven member, having alining axes, of a series of segmental shoes arranged in circumferential order one after the other and connected to the outer one of said members, and reciprocal wedging means for causing said shoes to engage the other member one after the other.

13. In a clutch mechanism the combination with a revoluble driving member and a concentric revoluble driven member, having alining axes, of a series of segmental shoes connected to one of said members, and longitudinally reciprocal plungers disposed transversely to said shoes for causing the same to engage the other member one after the other.

14. In a clutch mechanism the combination with a revoluble driving member and a concentric revoluble driven member, having alining axes, of a series of segmental shoes connected to one of said members, longitudinally reciprocal plungers disposed transversely to said shoes, and devices engaged thereby for causing said shoes to engage the other member one after the other.

15. In a clutch mechanism the combination with a revoluble driving member and a concentric revoluble driven member, having alining axes, of a series of segmental shoes connected to one of said members, longitudinally reciprocal plungers that are arranged transversely to said shoes and are adjustable longitudinally in their support, and devices engaged thereby for causing said shoes to engage the other member one after the other.

16. In a transmission clutch mechanism the combination with a revoluble driving member and a concentric driven member having alining axes, of a series of segmental clutch shoes, each having one end adjustably connected to one of said members, longitudinally reciprocal plungers arranged transversely to said shoes, and devices engaged thereby for causing said shoes to engage the other member one after the other.

17. In a clutch mechanism the combination with a revoluble driving member and a concentric revoluble driven member having alining axes, of a series of segmental shoes connected to one of said members, longitudinally reciprocal plungers arranged transversely to said shoes, and presser feet engaged thereby for causing said shoes to engage the other member one after the other.

18. In a clutch mechanism the combination with a revoluble driving member and a concentric revoluble driven member, having alining axes, of a series of segmental shoes connected to one of said members, longitudinally reciprocal plungers that are arranged transversely to said shoes and are adjustable longitudinally in their support, said support revoluble with said outer member and reciprocal to and from the same, and presser-feet engaged thereby for causing said shoes to engage the other member one after the other.

19. In a transmission clutch mechanism the combination with a revoluble driving member and a concentric driven member having alining axes, of a series of segmental clutch shoes, each having one end adjustably connected to one of said members, longitudinally reciprocal plungers arranged transversely to said shoes and presser-feet engaged thereby for causing said shoes to engage the other member one after the other.

In testimony whereof I have hereunto set my hand and seal this 18th day of March, A. D., 1907.

JOSEPH W. HAYS. [L. S.]

Witnesses:
FRANK D. THOMASON,
E. K. LUNDY.